United States Patent [19]
Mitchell et al.

[11] 3,756,367
[45] Sept. 4, 1973

[54] HYDRAULIC BRAKE SYSTEM BLEEDER

[75] Inventors: Wallace F. Mitchell, Arlington Heights; Charles C. Valentincic, Wadsworth, both of Ill.

[73] Assignee: Ammco Tools, Inc., North Chicago, Ill.

[22] Filed: Jan. 10, 1972

[21] Appl. No.: 216,483

[52] U.S. Cl............. 188/352, 220/85 B, 222/386.5
[51] Int. Cl.............................................. B60t 11/30
[58] Field of Search................... 188/352; 220/85 B; 222/386.5

[56] References Cited
UNITED STATES PATENTS

| | | |
|---|---|---|
| 2,735,589 | 2/1956 | Milster et al.................... 188/352 X |
| 3,057,517 | 10/1962 | Douglas...................... 222/386.5 X |
| 967,450 | 8/1910 | Sholes......................... 222/386.5 X |
| 3,455,349 | 7/1969 | Greenwood et al. ........... 188/352 X |

*Primary Examiner*—George E. A. Halvosa
*Attorney*—Fidler, Patnaude & Batz

[57] ABSTRACT

A portable brake bleeder utilizes a unitary, spherical housing in which a flexible, resilient bladder for containing hydraulic fluid is mounted. The bleeder is pressurized by supplying compressed air to the space in the housing surrounding the bladder.

6 Claims, 2 Drawing Figures

PATENTED SEP 4 1973

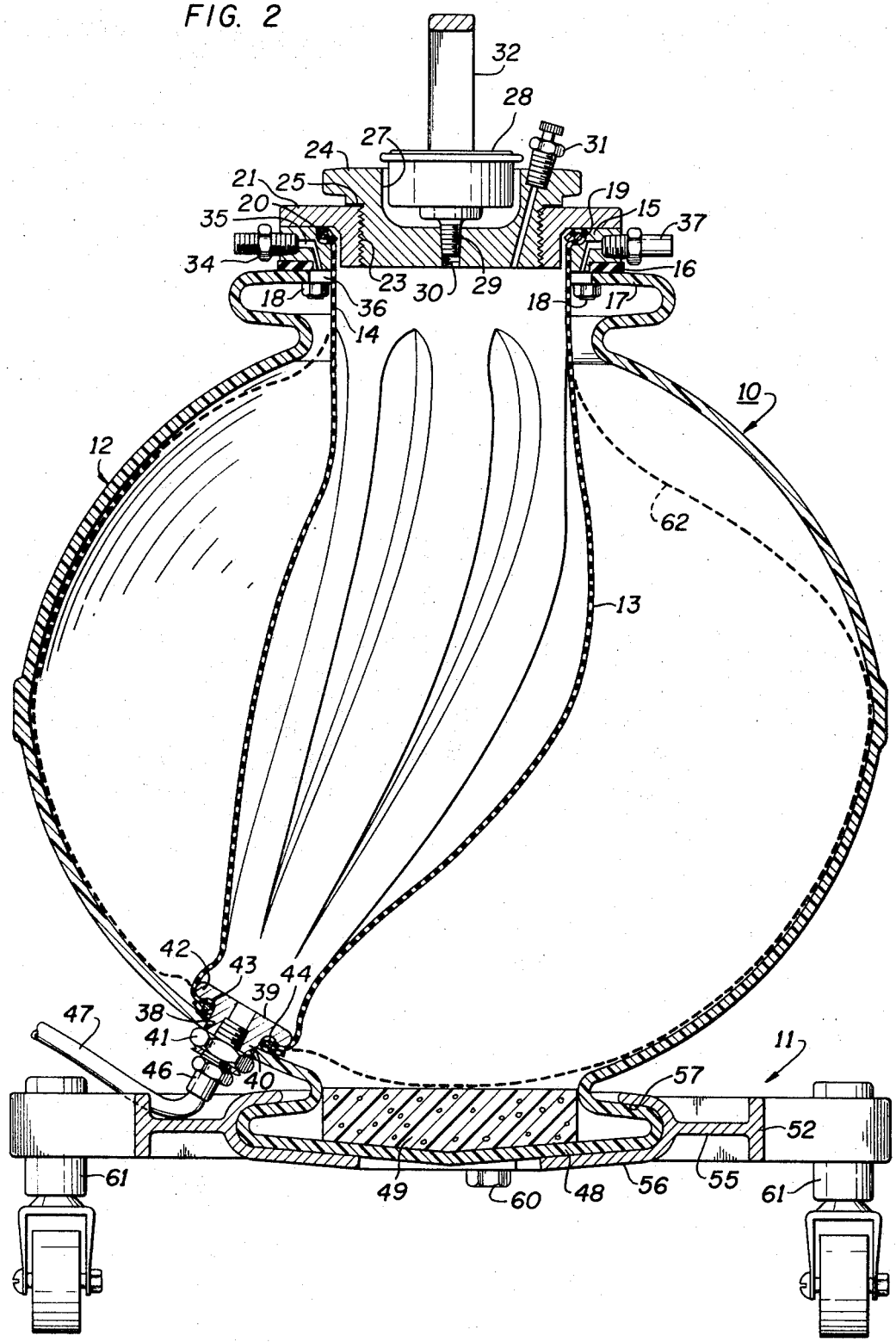

HYDRAULIC BRAKE SYSTEM BLEEDER

The present invention generally relates to apparatus for use in supplying hydraulic fluid under pressure to a hydraulic system, and it relates more particularly to a portable brake bleeder employing a pressurizable housing enclosing a flexible, resilient bladder for holding the brake fluid.

BACKGROUND OF THE INVENTION

Brake bleeders of the type to which the present invention relates have generally employed a pressure tank separated into two compartments by means of an impervious diaphragm. In order to withstand the usual operating pressures, such tanks have been metal castings, and difficulties caused by seepage of the brake fluid through the castings are commonplace. My copending application, Ser. No. 186,320, filed Oct. 4, 1971, discloses one brake bleeder design which eliminates this problem. In addition, however, replacement of the diaphragms has presented problems in the prior art brake bleeders.

OBJECTS OF THE INVENTION

Therefore, an object of the present invention is to provide a new and improved device for use in supplying hydraulic fluid to pressurized hydraulic systems.

Another object of this invention is to provide a new and improved brake bleeder.

A further object of this invention is to provide a brake bleeder of simple construction which maintains the brake fluid out of contact with the pressure housing.

A still further object of this invention is to provide a brake bleeder which is easily repaired.

SUMMARY OF THE INVENTION

Briefly, the above and further objects may be realized in accordance with the present invention by providing a pressure tank containing a resilient bladder having a fill inlet port and an outlet port opening through the housing. The outlet port is adapted to be connected to the hydraulic system so that when the tank is pressurized, hydraulic fluid contained in the bladder is supplied under pressure to the system.

BRIEF DESCRIPTION OF THE DRAWINGS

Further objects and advantages and a better understanding of the invention may be had from the following detailed description taken in connection with the accompanying drawings, wherein:

FIG. 2 is a cross-sectional view of the device of FIG. 1 taken along the line 2—2 of FIG. 1.

DETAILED DESCRIPTION OF THE DRAWINGS

Figure 1:
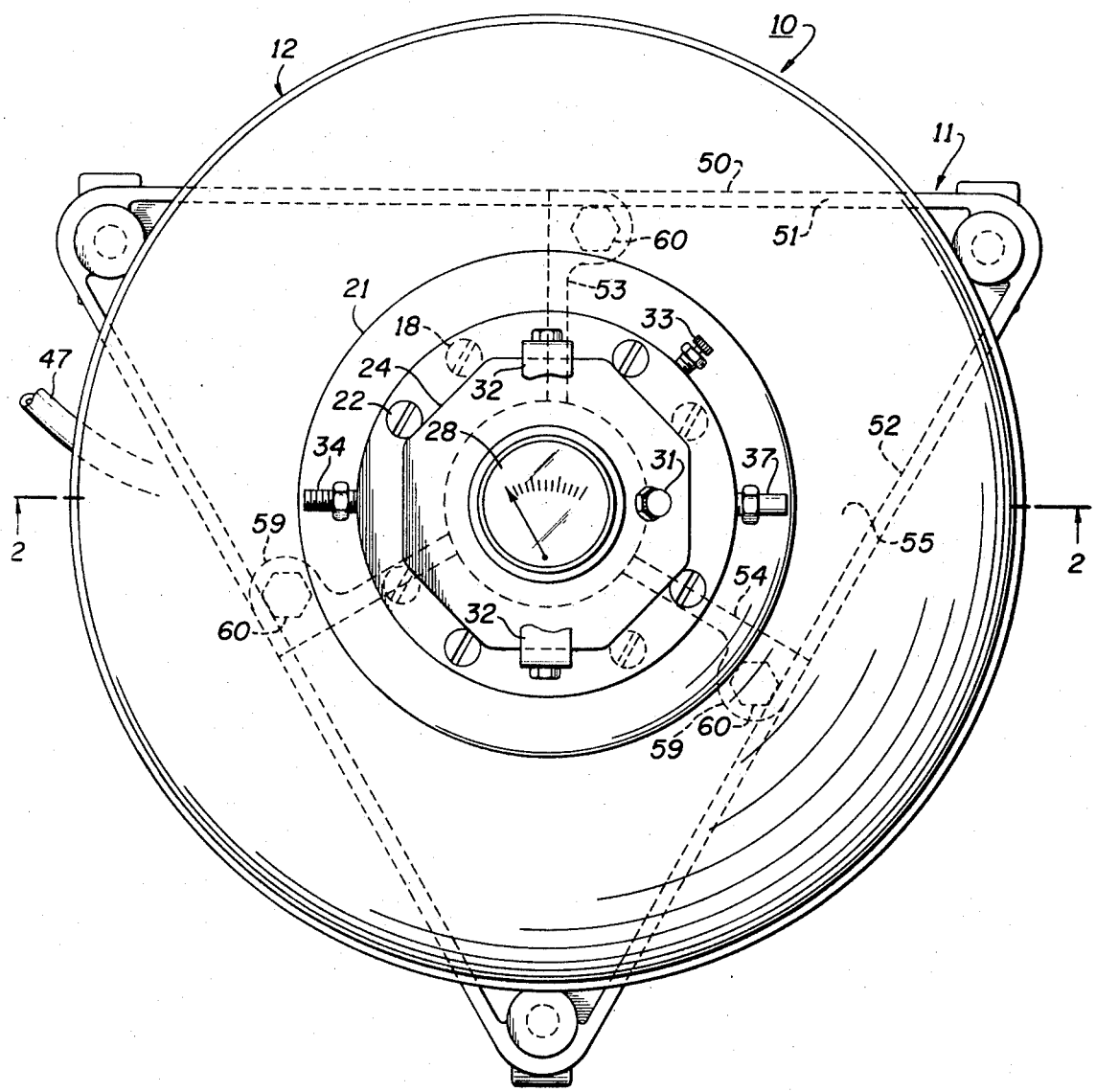
FIG. 1 is a top view of a brake bleeder embodying the present invention.

Referring now to the drawings, a brake bleeder 10 comprises a support stand 11, a spherical, pressurizable tank 12 and a flexible, resilient bladder 13 mounted within the tank 12 for holding a supply of hydraulic fluid. The tank 12 is, in the preferred embodiment of the invention, a unitary member which may be molded of plastic in a rotational molding operation. At the top, the tank 12 is provided with a circular opening 14 over which is sealably mounted a ring 15. A flat, annular gasket 16 is mounted in an external annular groove in the ring 15 and is compressed between the ring and the top wall portion 17 of the tank 12 to seal the ring 15 to the tank 12. As shown, a plurality of screw and nut assemblies 18 are used to secure the ring 15 to the tank 12. An annular groove 19 is at the inner diameter of the upper surface of the ring 15 to receive the mouth of the bladder 13. More particularly, the tubular upper end portion of the bladder is folded back on itself over a rigid ring 20 to form an annular bead which is held in place in the groove 19 by means of an adapter ring 21 secured to the ring 15 by means of a plurality of screws 22 which extend through the ring 21 and are threadedly received in suitably tapped holes in the ring 15. The adapter ring 21 is provided with a large, centrally disposed threaded bore 23 which receives a cover 24. A gasket 25 provides a pressure seal between the cover 24 and the ring 21. The cover 24 is removable from the adapter ring 21 in order to fill the bladder with the hydraulic fluid. Mounted directly on the cover 24 in a central recess 27 at the top thereof is a pressure gauge 28. The pressure gauge includes a central connector 29 which is threaded into a central bore 30 in the cover 24 for communicating the gauge 28 with the chamber in the bladder 13. A thumbscrew operated relief valve 31 is also mounted on the cover 24 to bleed air from the bladder 13. The cover 24 includes an upstanding U-shaped bail or handle 32, only partially shown in the drawings, for use in loosening and tightening the cover and also for facilitating handling of the brake bleeder 10.

In order to connect the pressure chamber to a source of compressed air, a connector 34 is threaded into the ring 15 in alignment with a passageway 35 which connects through a slot 36 in the top wall 17 of the tank 12 to the chamber within the tank 12 external of the bladder 13. Similarly, a pressure relief valve 37 is mounted by the ring 15 and connects to the chamber within the tank 12 external of the bladder 13 to prevent an excessive build-up of pressure within the brake bleeder. In addition, a thumbscrew operated valve 33 is mounted on the ring 21 over a passageway connecting to the pressure chamber to relieve the pressure therein before opening the cover 24.

The lower end of the bladder 13 is tubular and is sealably secured to the tank 12 over a hole 38 therein by means of a connector and sealing member 39 which has an externally threaded shank portion 40 extending through the hole 38. The connector is held in place by means of a nut 41. The connector 39 has an annular flange 42 which is grooved on its underside at 43 to receive the lower end of the bladder 13 and a rigid ring 44 around which the bottom tubular end portion of the bladder is wrapped. With the parts assembled as illustrated in FIG. 2 as the nut 41 is tightened the lower end of the bladder is tightly compressed between the flange 42 and the adjacent inner wall of the tank 12 thereby to effectively seal the chamber within the bladder 13 from the chamber within the tank 12 and also to seal the chamber within the tank 12 from the atmosphere. The connector 39 is centrally bored and threaded to receive a connector 46 which is adapted to be connected to the hydraulic system by means of a flexible hose 47.

The bottom of the tank 12 is shaped to provide a circular, generally disk-like, hollow base portion 48 in which a block 49 is positioned to prevent the bladder 13 from moving under pressure into the cavity within the circular base portion 48. The base member 11 comprises three identical sections 50 which are bolted together around the base portion 48 of the tank to secure the base 11 to the tank 12. Considered in greater detail, each of the base sections 50 includes a plurality of vertical sidewalls 51, 52, 53 and 54 extending above and below a web 55 to provide a tray for conveniently holding small parts and tools which are ordinarily used with the brake bleeder 10. The interior walls 53 and 54 are interconnected by an arcuate section 56 which is grooved as indicated at 57 in FIG. 2 to be complementary in shape to the external arcuate portion of the circular base 48. Each of the sections 50 has a flat, projection 59 which is adapted to be received in a correspondingly shaped groove at the bottom of the next adjacent section 50 in the final assembly. Three bolts 60 respectively extending through the projections 59 may thus be used to secure the three sections 50 together and to the tank 12. For convenience in handling the brake bleeder 10 and in moving it from one place to another, three caster assemblies 61 are respectively mounted in the external corners of the base sections 50.

OPERATION

In use, the cover 24 is removed and the bladder 13 is filled with brake fluid. Being very flexible, the bag will assume the shape indicated in phantom at 62 in FIG. 2. The cover is then tightened to seal the chamber within the bag 13 from the atmosphere and compressed air is supplied from a suitable compressor or other source through the connector 34 to raise the pressure within the tank 12 and thus within the bladder 13 to whatever pressure is desired as indicated by the pressure gauge 28. The bleed valve 31 is then opened momentarily to bleed the air from the bladder. If not previously connected, the hose 47 may then be connected in the normal manner to the hydraulic system and by opening a suitable valve in that line or connector, the brake fluid flows under pressure to the system.

Should it be necessary to inspect or replace the bladder 13, it is merely necessary to open the valve 33 to reduce the pressure in the tank and to then remove the ring 21 and the nut 41 whereby the entire bladder can be easily removed from the tank through the top opening. The opening 14 is sufficiently large so that a person may place his hand into the tank in order to assemble the connector 39 to the bladder and insert it in the opening 38 for receipt of the nut 41.

While the present invention has been described in connection with a particular embodiment thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. Apparatus for filling a hydraulic system with hydraulic fluid, comprising
   a substantially spherical, unitary plastic tank having a large opening centrally located in the top thereof and a small opening near the bottom but spaced from the center thereof,
   a bladder formed of a resilient, flexible material for holding a supply of hydraulic fluid and having a fill opening at the top and an outlet opening at the bottom,
   first sealing means sealably securing the top of said bladder to said tank with said fill opening adjacent said large opening at the top of said tank,
   second sealing means sealably securing the bottom of said bladder to said tank with said outlet opening adjacent said smaller opening in said tank,
   a cover sealably and removably connected to said tank over said inlet opening,
   a connector sealably and removably connected to said tank over said outlet for connecting the cavity in said bladder to a hydraulic system,
   a pneumatic inlet mounted by said tank exteriorly of said bladder for pneumatically pressurizing the chamber in said tank,
   said tank having a centrally located circular protrusion at the bottom,
   said protrusion including an annular flange, and
   a base formed of a plurality of angular segments secured together around said protrusion with each segment grooved to receive a portion of said flange thereby to secure said base to said tank.

2. Apparatus according to claim 1 further comprising
   a pressure guage mounted by said cover and operatively connected through said cover to the cavity within said bladder, and
   a U-shaped handle on said cover extending over said pressure guage.

3. Apparatus according to claim 1 wherein each of said segments has a dished recess in the top providing receptacles for small parts.

4. Apparatus according to claim 1 wherein said tank is a rotationally molded, one piece plastic part.

5. Apparatus according to claim 1 comprising
   a rigid, annular member sealably secured to said tank around said large opening therein,
   said bladder and said cover being independently and removably connected to said annular member.

6. Apparatus according to claim 5 wherein said pneumatic inlet extends through said annular member.

* * * * *